July 27, 1965

G. W. BROOKS 3,196,690

IMPACT SIMULATOR

Filed June 12, 1962

INVENTOR
GEORGE W. BROOKS

BY

ATTORNEYS

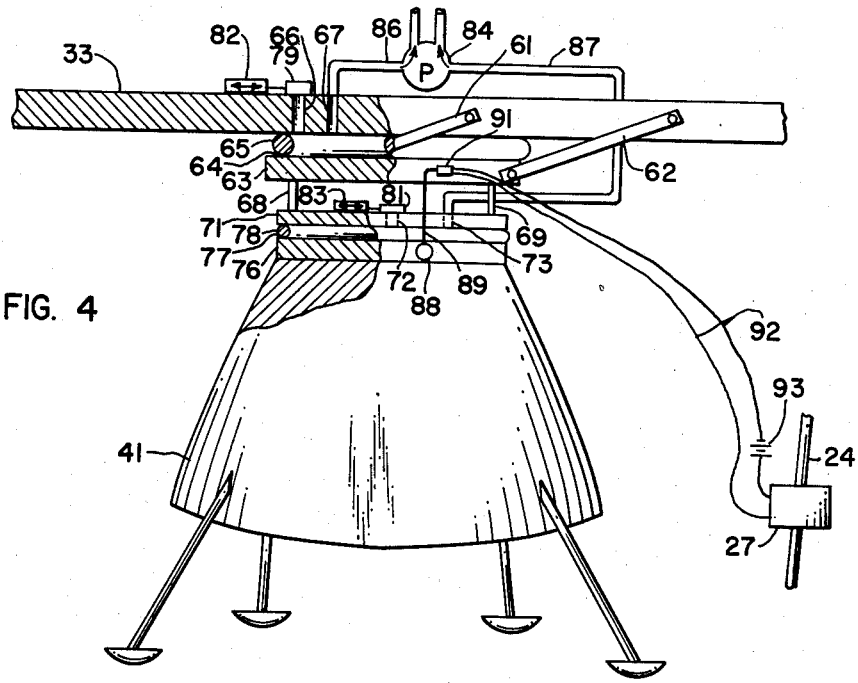
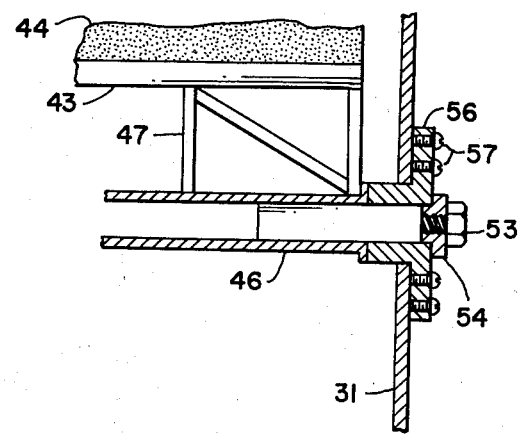

July 27, 1965

G. W. BROOKS 3,196,690

IMPACT SIMULATOR

Filed June 12, 1962

INVENTOR
GEORGE W. BROOKS

BY

ATTORNEYS

United States Patent Office 3,196,690
Patented July 27, 1965

3,196,690
IMPACT SIMULATOR
George W. Brooks, Tabbs, Va., assignor to the United States of America as represented by the Administrator of the National Aeronautics and Space Administration
Filed June 12, 1962, Ser. No. 202,029
25 Claims. (Cl. 73—432)
(Granted under Title 35, U.S. Code (1952), sec. 266)

The invention described herein may be manufactured and used by or for the Government of the United States of America for governmental purposes without the payment of any royalties thereon or therefor.

This invention relates generally to a system for simulating impact forces encountered by space vehicles or payloads during impact or landing. More particularly, this invention relates to a system for simulation and testing on the earth of the dynamic responses of prototype space vehicles and payloads during impact or landing on the surface of the moon, and on other surfaces where the effective gravitational accelerations of the impacting or landing body relative to that surface are different from the gravitational accelerations of the earth.

It is contemplated that in the near future space vehicles will be frequently landed on the moon and other celestial bodies, and efforts are presently being commenced which will eventually lead to transporting and landing of human beings on the moon and their safe return to earth. In order to positively determine the optimum structural configuration and materials, as well as the internal shock protective apparatus required, for vehicles and payloads of this type, more information regarding impact loads anticipated for specific landings must be obtained. The most practical way of obtaining such information is to conduct landing or impact tests with vehicle models on targets which simulate, as near as possible from known factors, actual conditions anticipated on the moon and other ultimate targets.

Presently known impact and landing tests are conducted on targets fixed relative to the earth's surface. However, since it is known that the moon and other celestial bodies exhibit gravitational fields differing from that of the earth, the gravitational forces which will act on a space vehicle or payload during impact or landing on the surface of these bodies, obviously, will not be simulated during impact or landing tests on surfaces which are fixed relative to the surface of the earth, as in this prior art procedure.

Accordingly, an object of the present invention is to provide a test apparatus for simulating gravitational fields of the moon and other celestial bodies.

Another object of the instant invention is the provision of a test apparatus for simulation and testing on the earth of the dynamic responses of prototype space vehicles and payloads during impact or landing on the surface of the moon and other celestial bodies having gravitational fields differing from that of the earth.

Still another object of the present invention is to provide a test apparatus having an impact surface simulating the surface slopes and surface conditions anticipated for landing of space vehicles and payloads on the moon and other celestial bodies.

A further object of the present invention is to provide a test device capable of simulating on the earth a variety of conditions anticipated on various celestial bodies.

An additional object of the instant invention is to provide a test device simulating anticipated impact conditions for various types of space vehicles and payloads.

Another additional object of the present invention is a new and novel method of simulating the gravitational field of the moon.

A further additional object of the present invention is to provide a novel support and release mechanism for a payload in a test apparatus.

A still further object of the present invention is to provide novel mechanism for imparting a lateral velocity to a payload during a free fall test.

In accordance with the present invention, the foregoing and other objects are attained by providing an impact simulator including two masses $M_1$ and $M_2$ suspended from opposite ends of a cable passed over two horizontally disposed pulleys. A suitable brake or retention mechanism is provided to maintain the system immobile until released. Mass $M_2$ is adjustable in weight to compensate for frictional and aerodynamic drag on the system, and is provided with counterpoise weights, while mass $M_1$ includes a housing for impact apparatus. The impact apparatus includes an adjustable track from which may be suspended a simulated payload or prototype space vehicle; the track being adjustable vertically to provide for desired release drop velocities of the test object, and laterally adjustable to vary the impact or target zone. The impact apparatus also includes a solid angularly adjustable impact surface covered with a chosen surface simulative material such as dust, sand, rock, or the like.

For simulating impact of a test vehicle on the moon, for example, the payload is given the desired lateral velocity and released for free fall under earth gravity or one "$g$" condition. Immediately prior to impact of the falling payload, the brake or retention mechanism is actuated to permit mass $M_1$ to accelerate downward, or away from the falling payload, while mass $M_2$ accelerates upwardly at $\frac{5}{6}$ earth gravity, thereby producing an effective simulation of the moon's gravitational field, or $\frac{1}{6}$ earth "$g$," for the payload at touchdown or impact. At initial touchdown, the payload will bounce one or more times and leave the impact surface momentarily on each bounce. Since the acceleration of the impact surface remains at $\frac{5}{6}g$, and the payload will fall again at $1g$ after each bounce, the gravitational field of the moon will continue to be simulated until the payload comes to rest. After the payload ceases to bounce, the system is brought to rest by the lifting of a nonlinear arrangement of counterpoise weights secured to mass $M_2$.

For simulation of gravitation fields exceeding that of the earth, mass $M_2$ exceeds mass $M_1$ by a predetermined amount and, accordingly, would be accelerated downward, when released, causing mass $M_1$ to accelerate upward or toward the free falling payload.

The acceleration of mass $M_1$ is given, neglecting friction, by the formula $$a = ng = g\frac{(M_1 - M_2)}{(M_1 + M_2)}$$

where "$n$" is a constant selected for the simulation of the particular gravitational field of interest, and "$g$" is the gravitational constant of the earth. For a particular value of "$n$," the mass $M_2$ is given by the formula $$M_2 = M_1\frac{(1-n)}{(1+n)}$$

For simulation of the moon's gravitational field, "$n$" should be approximately equal to $\frac{5}{6}$, and thus $$M_2 = \frac{M_1}{11}$$

in this instance.

A more complete appreciation of the invention and many of the attendant advantages thereof will be readily appreciated as the same becomes better understood by reference to the following detailed description when considered in connection with the accompanying drawings therein:

FIG. 3 is a sectional view taken in the direction of the arrows along line 3—3 of FIG. 1;

FIG. 4 is an enlarged view partly in section showing one form of payload retention and release mechanism; and, FIG. 5 is a modification of the payload retention and release mechanism similar to that shown in FIG. 4.

Figures 1, 2:
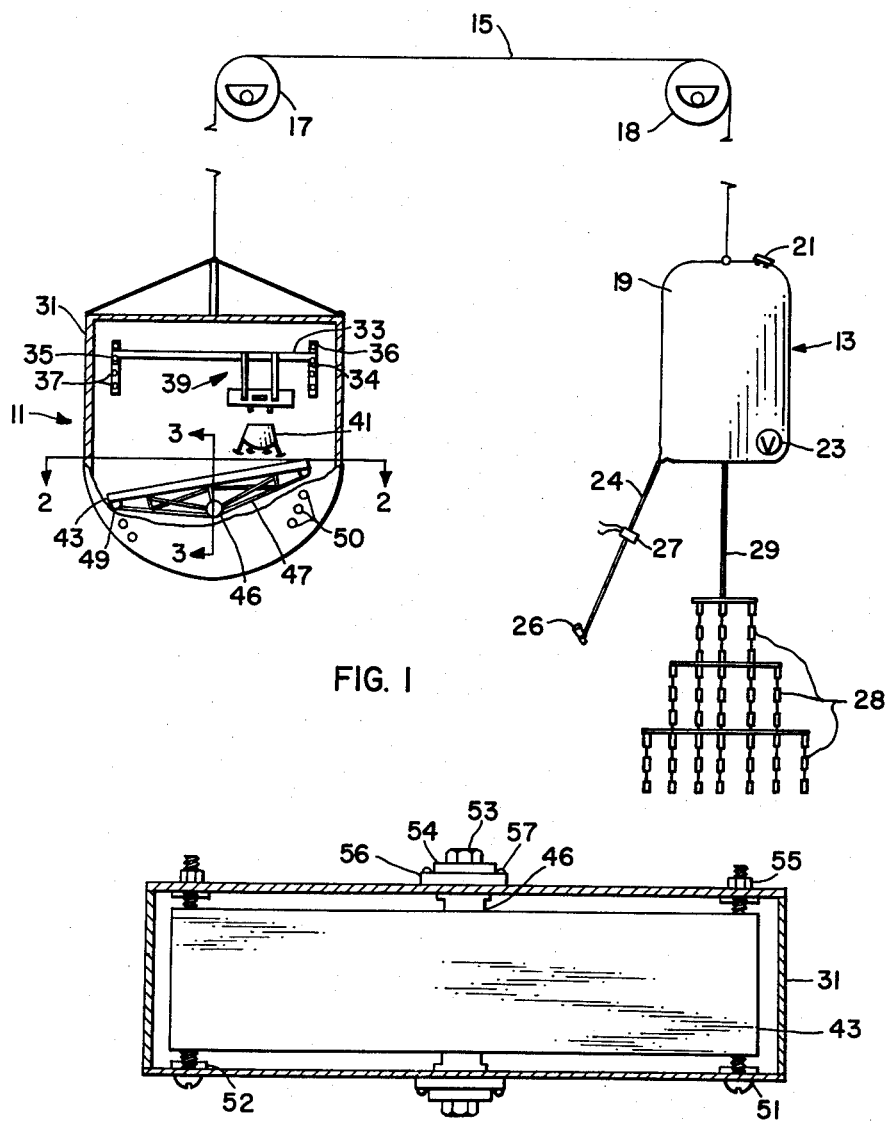
FIG. 1 is a front elevation of an impact simulator system according to the present invention with parts broken away for clarity and parts diagrammatically shown.
FIG. 2 is a sectional view taken in the direction of the arrows along line 2—2 of FIG. 1.

Referring now to the drawings wherein like reference numerals designate identical or corresponding parts throughout the several views, and more particularly to FIG. 1, the impact simulator system according to the present invention comprises a pair of unequal masses $M_1$ and $M_2$ and generally designated, respectively, by reference numerals 11 and 13, suspended from opposite ends of a cable 15 passed over two horizontally disposed pulleys 17 and 18. As discussed hereinbefore, mass 13 ($M_2$) will be equal to one eleventh of mass 11 ($M_1$) when employing the present invention to simulate lunar gravity. Mass 13 comprises a hollow tank member 19 adapted to contain a quantity of dense flowable material therein for controlled weight adjustment. A plug 21 closes a tapped opening for admitting the flowable material to one end of tank 19, while a valve 23 is located on the opposite end thereof for effecting removal of the flowable material at a controlled rate. The flowable material employed in hollow tank 19 may be water, sand, shot or any other suitable dense and flowable material, as so desired. A severable cable 24, having one end secured to ground stake 26 and the other end thereof attached to tank 19, serves to prevent rotation of pulleys 17, 18 until severed. The severance of cable 24, and the corresponding release of the system during a test sequence, is effected by a conventional pyrotechnic cutter 27 disposed around cable 24 and actuated in response to a suitable signal. It is obvious that other conventional retention and braking mechanism may also be employed for the system such as, for example, suitable brakes may be provided on the shafts of either or both pulleys 17, 18 and, selective brakes may also be attached to portions of cable 15, within the scope of the present invention. Tank 19 is also attached to a nonlinear arrangement of anchor chains or counterpoise 28, by a cable 29, and the function of which will be further explained hereinafter.

Mass 11 includes a housing 31 for suitable impact apparatus. Housing 31 may be formed of any suitable sheet material and may be provided with a service door or other readily removable sections, not shown, to facilitate entry therein by service crews, for installation and removal of the test vehicle and, to conduct necessary maintenance. The impact apparatus includes a rigid track member 33 which is provided on its lower surface, at opposite ends thereof, with a pair of ears 34. Two pair of vertically disposed brackets 36, each being provided with a row of holes 37, alined with similar rows of holes, not shown, in housing 31, are secured to opposing internal faces of impact housing 31. A pair of removable elongated bolts 35, extending through housing 31, brackets 36, and ears 34 of track 33, provide for selective vertical adjustment of track 33. The width of track 33 is only a fraction of the length of bolts 35 and track 33 may, accordingly, be moved along the length of bolts 35 for lateral adjustment of the release and impact zone for a suitable payload 41. A support and release mechanism, shown generally by reference numeral numeral 39, secures payload or prototype vehicle 41 to track 33, in position for impact testing, as will be more fully explained hereinafter.

A solid angularly adjustable impact table 43, of substantially the same rectangular configuration as the cross-sectional interior of housing 31, is provided with a chosen surface simulative material, for example sand 44 (FIG. 3), and securely positioned within housing 31 at a spaced selective distance from track 33. Dust, rock, and other suitable simulative surfaces may also be employed as a surface coating for impact table 43 when desired. Impact table 43 is rotatable about a central tubular axle 46, secured thereto by reinforced truss structure 47.

A pair of depending ears 49 are provided at each end of impact table 43 for the passage therethrough of adjusting bolts 51, as illustrated more particularly in FIG. 2. Bolts 51 extend through the side wall of housing 31, which is reinforced along the adjusting holes 50 therein by suitable brackets 52. Suitable taps 55 serve to secure bolts 51 in position. It is also permissible, instead of employing long bolts and taps for securing impact table 43 in position, to utilize two pair of short pins on opposite sides of housing 31 to extend through ears 49 of table 43.

Referring now more particularly to FIG. 2 and FIG. 3, an expandable bolt 53, provided with a support washer 54, is positioned within each end of tubular axle 46 to extend through a respective side wall of housing 31, by way of a tubular flange 56. Each flange 56 is secured to the side wall of housing 31 by a plurality of bolts 57 with the tubular portion thereof extending through the side wall and abutting the end of tubular axle 46. To angularly adjust impact table 43, expandable bolts 53 are slightly loosened, bolts 51 removed, and table 43 then rotated to the desired tilt by simultaneously turning the heads of bolts 53 in the desired direction. When the desired angle is achieved, adjusting bolts 51 are reinserted through corresponding holes in side wall of housing 31 and expandable bolts 53 securely tightened. The purpose of tilting impact table 43 at various angles is to simulate known surface slopes for various bodies as well as to simulate landings at various angles of attack for prototype vehicle 41. Although two expandable bolts are shown, one would suffice under most conditions and the other may be replaced by a suitable axle, not shown.

Referring now more particularly to FIG. 4, one mechanism for retaining a payload or prototype space vehicle 41 in position, as well as one form of acceleration and release mechanism for the payload, is shown. Four freely pivotable support rods, two of which are designated by reference numerals 61, 62, serve to connect the periphery of a swinging plate 63 to the sides of track member 33. Plate 63 is provided on the upper surface thereof with an annular groove 64 circumscribing the major surface area thereof and in which is securely positioned a resilient O ring member 65. The major surface area of O ring 65 remains exposed and is adapted to seal against the bottom surface of track 33, to provide an enclosed space between plate 63 and track member 33, when placed in contact therewith. A pair of openings 66, 67 are provided in track 33 leading to the enclosed space bounded by O ring 65.

A plurality of rigid support rods, two of which are illustrated by reference numerals 68, 69, securely attach an annular support plate 71 in fixed spaced relationship with swinging plate 63. Support plate 71 is also provided with a pair of through holes 72, 73 as shown by broken lines in FIG. 4.

An adapter plate 76 is secured to the payload or prototype vehicle 41 by suitable bolts or clamps, not shown. Adapter plate 76 is provided on the exposed surface thereof with an annular groove 77 circumscribing its major surface area and in which is also securely disposed a resilient O ring 78. The major surface area of O ring 78 also remains exposed and is adapted to effect a seal with support plate 71, and to encircle an enclosed space between support plate 71 and adapter plate 73, when placed in contact therewith.

Hole 66 in track 33, and hole 72 in annular support plate 71 are adapted to be closed, respectively, by sliding plates 79, 81. Plates 79, 81 serve as sliding valves and are each selectively movable, between a position in which they cover holes 66 and 72 and in a position in which the holes are open, by respective solenoid actuators 82, 83.

A vacuum pump 84, which may be supported by track 33 or positioned exteriorly of housing 31, is provided with a pair of flexible lines 86, 87 which lead through hole 67 in track 33 and hole 73 in support plate 71, respectively, as will be further explained hereinafter.

A spool 88 is rotatably secured to the periphery of adapter plate 76 with one end of a length of cord 89 fixedly attached thereto and the excess portion wound therearound. The other end of cord 89 connects to a microswitch unit 91 which, in turn, may be secured to the periphery of swinging plate 63. Microswitch 91 connects through lead wires 92 and battery power source 93 to pyrotechnic cutter 27, as will be further explained hereinafter. In addition, microswitch 91 may also be adapted to actuate release brakes for either or both of pulleys 17 and 18 when they are so equipped.

In operation, referring now more particularly to FIGS. 1 and 4, the support and release mechanism for vehicle 41 is positioned as shown in FIG. 4 and maintained in this position by the creation of a vacuum, in the space between track 33 and swinging plate 63 and in the space between support plate 71 and adapter 76, through the use of vacuum pump 84. When it is desired to test the impact of vehicle 41, having a lateral as well as a vertical component of velocity, solenoid 82 is actuated by suitable conventional means, not shown, to remove sliding plate 79 from opening 66 to thereby release the vacuum at this point and permit swinging plate 63 and its attached components to freely swing down and laterally under the control of pivotable support bars 61, 62, and others, not shown. As plate 63 and its attached payload 41 swing laterally, the acceleration thereof will obviously increase along the path of movement, as is true of any free falling body. This acceleration increase continues until payload 41 reaches a maximum distance from track 33; this distance being governed by the length of pivotable support bars 61, 62, and others, not shown. Thus, appropriate tests for various payload vertical and lateral components of velocity, within these limits, may be conducted by selecting the point along the swinging path of movement of plate 63 and its attached components for the release of payload 41 therefrom. When the desired payload lateral acceleration is attained, i.e., the point during the swing that the lateral payload acceleration for a specific test is achieved, solenoid 83 is actuated to remove sliding plate 81 from opening 72 to thereby release the retention vacuum for vehicle 41 and permit its free fall under 1g conditions. The length of cord 89 on spool 88 is controlled so that, immediately prior to impact of payload 41 with impact table 43, microswitch 91 is actuated to effect release of the system and thereby accelerate mass 11, carrying impact table 43 therein, in the same general direction as, but at a slower rate than, free falling payload 41.

As mentioned hereinbefore, valve 23 may be actuated, simultaneously with the actuation of pyrotechnic cutter 27, by suitable mechanism, not shown, to promote programmed discharge of the flowable material in tank 19 to thereby compensate for frictional and aerodynamic drag on the system. Also, any other suitable control mechanism may be employed to release the system such as, for example, an electric eye circuit, not shown, may be closed by the falling payload to actuate cutter 27.

The rate of acceleration of impact table 43 away from falling payload 41 is precalibrated, as discussed hereinbefore, and when simulating lunar landings this rate would be 5/6 earth "g." At initial touchdown, payload 41 will normally bounce one or more times, during which time impact table 43 will continue to be accelerated at the same rate. Since payload 41 will continue to fall under 1g conditions, the gravitational field of the moon, which is 1/6 earth "g," will continue to be simulated until the falling payload comes to rest.

It is desirable to gradually bring the simulator system to rest in order to prevent damage to the various components thereof. One mechanism for accomplishing this purpose is illustrated in FIG. 1, wherein cable 29 is adapted to lift a nonlinear arrangement of anchor chains 28. The length of cable 29 is precalibrated such that it will not become tensioned until payload 41 comes to rest on impact table 43, at which time weights 28 are slowly and uniformly lifted until sufficient force is exerted to immobilize the system. After the system is brought to rest, the payload or prototype vehicle 41 may be removed from housing 31 and the various components thereof examined to determine any failures and needed changes in structure.

When it is desired to test the impact forces exerted on payload 41 having only a vertical component of velocity, the vacuum between swinging plate 63 and track member 33 is maintained and only solenoid release 83 actuated to effect free fall of vehicle 41. The remainder of the test sequence remains the same. It is also possible to initiate a delay actuator for pyrotechnic cutter 27 by suitable mechanism, not shown, at the same time solenoid release 83 is actuated in lieu of the microswitch and cord arrangement discussed hereinbefore.

Figure 5:
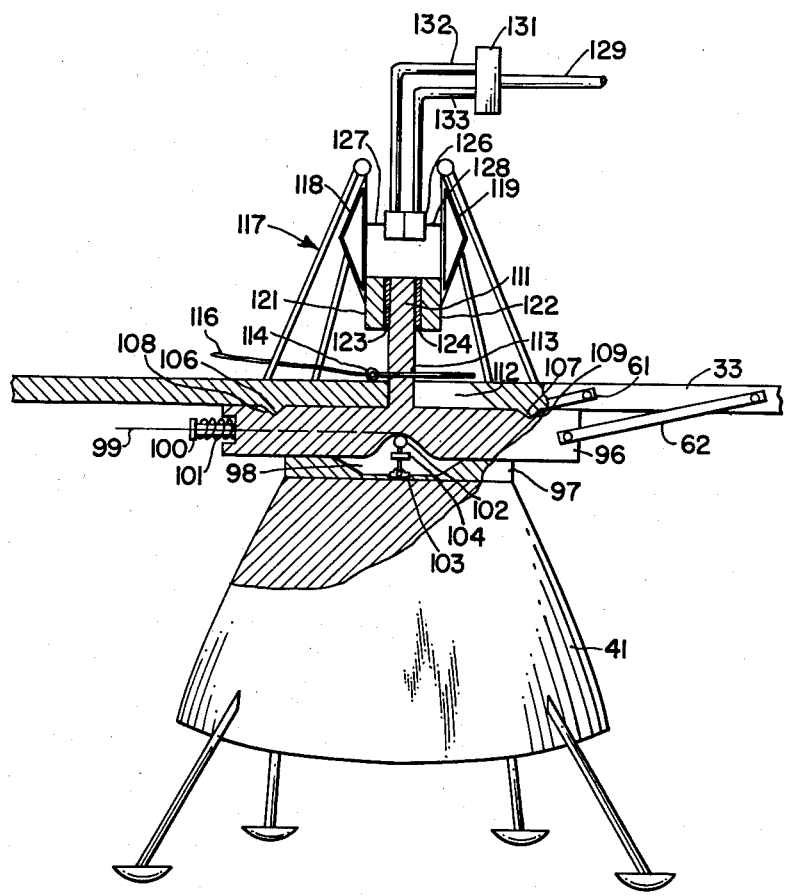

Referring now more particularly to FIG. 5, a modification of the support and release mechanism shows payload 41 maintained in contact with a swinging plate 96 by way of an adapter plate 97. The abutting surfaces of plates 96 and 97 are provided with a central cut-away portion to provide an enclosed space 98 therebetween. A cable 99 extends radially through an opening in the side wall of swinging plate 96 and passes over a freely rotatable pulley 102 on the inner surface thereof to connect with a ring member 103 integrally secured to the face of the cut-away portion of adapter plate 97. Cable 99 tensioningly secures plate 97 and its attached payload 41 in position through internally threaded hollow tensioning bolt 100 and spiral spring 101. A conventional pyrotechnic cutter 104 is also attached to cable 99 within space 98, as will be more fully explained hereinafter. The lower surface of track 33 in this embodiment is provided with a plurality of depending projections or ears, two of which are illustrated by reference numerals 106, 107. These projections 106, 107 are adapted to engage mating indentations 108, 109 in swinging plate 96, when plate 96 abuts against track 33, and serve to prevent lateral displacement thereof. An elongated projection 111 is integrally formed on the face of swinging plate 96 to extend through an enlarged opening 112 in track 33. Opening 112 and elongated projection 111 are so related as to permit the required downward and lateral movement of swinging plate 96 as will be further explained hereinafter. Projection 111 is provided with an opening 113 for the reception therethrough of a safety pin 114 having an attached pull cord 116 to facilitate remote removal thereof, when it is desired to release plate 96 for movement. A suspension network, shown generally by reference numeral 117 is secured to the upper surface of track 33 to support a pair of freely pivotable cantilever arms 118, 119. Cantilevers 118, 119 have metallic brakeshoes 121, 122 securely attached to the respective free ends thereof with fibrous linings 123, 124 being provided on shoes 121, 122 to selectively engage and retain projection 111 in position.

A valve and piston arrangement, shown generally by reference numeral 126, is positioned between cantilevers 118, 119 and connected thereto by piston shafts 127, 128. An air line 129 leads from a compressed air source, not shown, through a two-way solenoid actuated valve assembly 131 with a pair of conduits 132, 133 connecting with solenoid actuated valve assembly 131 and leading into valve and piston assembly 126. The valve and piston assembly 126, a conventional double acting type power cylinder, is so constructed that when compressed air is received from conduit 132, cantilevers 118, 119 will be pulled toward each other by piston shafts 127, 128 causing a braking force to be exerted on projection 111, and when solenoid valve assembly 131 is actuated to direct the compressed air through conduit 133, cantilevers 118, 119 will pivot away from each other and release projection 111. The release of projection 111 permits plate 96 to swing laterally under the control of pivotable support bars 61, 62 and others, not shown. It is also to be understood that a source of hydraulic fluid may be employed in lieu of the compressed air retention and release actuating force leading to line 129, when so desired, within the scope of the present invention.

With the support and release mechanism for payload or proto-type vehicle 41 positioned as shown in FIG. 5, the operation of this embodiment is very similar to that of FIG. 4. Fluid from line 129 is directed through line 132 by selective actuation of valve 131 and a braking force applied to projection 111 by cantilever supported brakeshoes 121, 122. Safety pin 114 may then be removed and swinging plate 96 and its supported payload 41 are retained in position only by the influence of the fluid being received by valve and piston assembly 126. When it is desired to release payload 41 for test purposes, valve 131 is actuated to direct the fluid through line 133 and cause cantilevers 118, 119 and their associated brake mechanism to release projection 111 of plate 96 for downward swinging movement under the control of support rods 61, 62 and others, not shown. When the desired lateral velocity for a particular test is attained for payload 41, along its arced path of movement, pyrotechnic cutter 104 is actuated by suitable means, not shown, to release payload 41 for free fall. The remaining operation of the embodiment illustrated in FIG. 5 is the same as that described hereinbefore for FIG. 4 with suitable mechanism, not shown, being connected to adapter plate 96 to effect release of the system immediately prior to touchdown of payload 41 with impact table 43. When it is desired to eliminate the lateral component of velocity for test vehicle 41 in this embodiment, only pyrotechnic cutter 104 need be actuated to release vehicle 41 for free fall.

Obviously, numerous modifications of the described embodiments will be readily apparent to those skilled in the art. For example, the inclusion of rockets, suitable springs, pneumatic and hydraulic mechanisms for additional acceleration variances of both the payload 41 and impact housing 31 are readily recognized as being within thes cope of this invention. In addition, it is also within the scope of this invention, with obvious modifications, to evacuate or pressurize housing 31, or to install the complete system in a vacuum or pressure chamber for simulation of different anticipated conditions on the surface of the moon and various planets. The support and release mechanism illustrated in FIG. 4 would normally be used when testing under atmosphric conditions while that shown in FIG. 5 would prove most practical when employing a vacuum chamber environment.

The materials employed for construction of the various components of the system are not critical although it is preferred that at least one side wall of housing 31 be of transparent construction or equipped with suitable viewing windows so that visual observations may be made during a test sequence.

Also, as discussed hereinbefore, when it is desired to simulate gravitational fields exceeding that of earth, mass 13 is calibrated to exceed mass 11 wherein, upon release of the system, impact table 43 will be accelerated toward falling payload 41.

Test systems may be constructed in accordance with this invention useful in testing full scale space vehicle models weighing hundreds of pounds wherein cable 15 could exceed several hundred feet in length. Also any degree of smaller systems may be constructed even within the confines of a small laboratory space, for testing of smaller payloads or scale models thereof, within the scope of this invention.

It is to be understood that the foregoing disclosure relates only to preferred embodiments of the invention, and that numerous modifications and variations of the present invention are possible in the light of the above teachings, without departing from the spirit and the scope of the invention, as set forth in the appended claims.

What is claimed and desired to be secured by Letters Patent of the United States is:

1. A test apparatus for simulating effective gravitational accelerations for free falling objects in an environment having a gravitational field unequal to that of earth, comprising: support means releasably retaining a test object, means to release said object for free fall, an impact surface for said object vertically spaced from said support means, and means to accelerate said impact surface in the same general direction as said free falling object and at a predetermined rate less than that of said free falling object prior to impact of said object with said surface.

2. A test apparatus for simulating effective gravitational accelerations for free falling objects in an environment having a gravitational field unequal to that of earth, comprising: a housing, vertical support means disposed in said housing, a test object releasably retained by said support means, means to release said object for free fall, an impact surface for said object within said housing and spaced from said support means, and means to accelerate said housing and its contained impact surface in substantially the same direction as said free falling object immediately prior to impact of said object with said surface, whereby the effective gravitational acceleration of said object at impact with said surface will be less than gravitational accelerations experienced by said object when falling on a surface fixed relative to the earth's surface.

3. A test apparatus for simulating effective gravitational accelerations for free falling objects in an environment having a gravitational field unequal to that of earth, comprising: horizontal support means releasably retaining a test object, acceleration means operatively connected to said support means and said test object for imparting lateral velocity to said object, means to release said object for free fall when the desired lateral velocity for a particular test situation is attained, an impact surface for said object spaced from said support means, and means to accelerate said impact surface after release of and at a predetermined rate less than that of said free falling object in substantially the same direction as that of the falling object immediately prior to impact of said object with said surface.

4. A test apparatus for simulating effective gravitational accelerations for free falling objects in an environment having a gravitational field unequal to that of earth, comprising: a housing, support means secured within said housing, a test object releasably suspended from said support means, means to release said object for free fall, an impact surface for said object within said housing and spaced from said support means, and means to vertically accelerate said impact surface prior to impact of said object with said impact surface.

5. A system for simulating and testing on the earth the dynamic responses anticipated for a space vehicle during landing on the surface of a celestial body, where the effective gravitational acceleration of said vehicle relative to said surface is unequal to that on earth, comprising, in combination: a prototype vehicle, means for accelerating said vehicle along an arced path to a predetermined velocity, means for effecting vertical vehicle fall upon attainment of said predetermined velocity, a solid impact surface for said vehicle vertically spaced from the position of said vehicle during initial fall thereof and means for accelerating said impact surface in a substantially vertical direction prior to impact of said falling vehicle with said surface.

6. A system for simulating and testing on the earth the dynamic responses anticipated for a space vehicle during landing on the surface of a celestial body, where the effective gravitational acceleration of said vehicle relative to said surface is unequal to that on earth, comprising, in combination: a prototype vehicle, means for accelerating said vehicle along an arced path to a predetermined velocity, means for releasing said vehicle for free fall upon attainment of said predetermined velocity, an impact surface for said vehicle vertically spaced from the position of said vehicle prior to release thereof, said impact surface being provided with a layer of material simulating known surface conditions on said body, and means for accelerating said impact surface prior to impact of said vehicle with said surface in a direction substantially the same as that of said free falling vehicle and at a predetermined rate less than that of said free falling vehicle.

7. A system for simulating and testing on the earth the dynamic responses anticipated for a space vehicle during landing on the surface of a celestial body having a gravitational field unequal to that of earth, comprising, in combination: support means releasably retaining a prototype vehicle, means operatively connected to said vehicle for accelerating said vehicle to a predetermined velocity, means operatively connected to said support means effecting release of said vehicle for free fall upon attainment of said predetermined velocity, a solid angularly adjustable impact surface for said vehicle vertically spaced from the position of said vehicle prior to release thereof, and means for accelerating said impact surface in substantially the same direction as that of said free-falling vehicle prior to impact of, and at a predetermined rate less than that of, said free falling vehicle.

8. A system for simulating and testing on the earth the dynamic responses anticipated for a space vehicle during landing on the surface of a body having a gravitational field unequal to that of earth, comprising, in combination: support means releasably retaining a prototype vehicle, means for releasing said vehicle for free fall, a solid impact surface for said vehicle vertically spaced from the position of said vehicle prior to release thereof, and means for accelerating said impact surface in substantially the same direction as that of the free-falling vehicle, prior to impact of said vehicle with said surface and, at a predetermined rate less than that of said free falling vehicle.

9. A system according to claim 8 including a unitary housing enclosing said support means and said impact surface; said support means including a horizontally disposed track member secured internally of said housing, a first plate member pivotally connected to said track member in spaced relationship therewith, a second plate member integrally secured in spaced relationship to one surface of said first plate member, an O ring secured within a groove in the other surface of said first plate encircling the major surface area of said first plate, the major surface area of said O ring being exposed and serving to enclose a space between said first plate and said track member, means for selectively creating a vacuum within said space whereby, when a vacuum is created within said space said O ring will be maintained in contact with said track member and said first track member will be maintained adjacent said track member by said vacuum and, when said vacuum is released from said space said first plate will pivot downwardly and laterally away from said track member under the force of earth gravity.

10. A system according to claim 9 including an adapter plate integrally secured to said vehicle, means for selectively creating a vacuum between portions of said adapter plate and said second plate whereby, when a vacuum is present between said adapter plate and said second plate said vehicle will be maintained adjacent said second plate and, when the vacuum is released between said adapter plate and said second plate said vehicle will be released for free fall.

11. A system according to claim 8 including a unitary housing enclosing said support means and said impact surface; said support means including a horizontally disposed track member secured internally within said housing, a plurality of rod members pivotally connected to said track member, a plate member pivotally connected to said plurality of rod members horizontally disposed beneath said track member, an elongate extension integral with said plate member on the surface thereof facing said track member, said elongate extension being received through an opening in said track member when said plate member is in a first position, means to selectively maintain said elongate extension in said track member opening, an adapter element integrally secured to said vehicle and, a cord member securing said adapter element to said plate member.

12. A system according to claim 11 including spring means tensioning said cord member to maintain said vehicle adjacent said plate member and, said means for releasing said vehicle for free fall including a pyrotechnic cutter in operative relationship with said cord member.

13. A system according to claim 11 wherein said means to selectively maintain said elongate extension in said track member opening includes a suspension network integral with the top surface of said track member; said suspension network including a pair of freely pivotable cantilever arms extending from said suspension network, brakeshoe members integrally secured to the free ends of said cantilever arms for engagement with said elongate extension, a valve and piston mechanism supported between said cantilever arms, a pair of conduits leading to said valve and piston mechanism, said pair of conduits connecting to a central fluid source and, selectively control means for admitting fluid individually to each member of said pair of conduits from said central source whereby, when fluid is admitted to one member of said conduit pair, said valve and piston mechanism maintains said cantilevers in position to exert a braking force on said elongate extension and, when fluid is admitted to the other member of said pair, said valve and piston mechanism forces said cantilevers apart to release said elongate extension and permit said plate member to pivot downwardly and laterally away from said track member under the control of said plurality of rod members to thereby impart a lateral acceleration to said vehicle prior to release of said vehicle by said release means.

14. Apparatus for simulating and testing on the earth the dynamic responses anticipated for a payload during impact on the surface of a celestial body having a gravitational field unequal to that of earth, comprising: a pair of horizontally displayed pulleys, a cable passed over said pulleys secured to and effecting suspension of a first and a second mass at opposite ends thereof; said first mass including a housing for impact apparatus, said impact apparatus including a horizontally disposed track member, means supported by said track member for releasably securing said payload thereto, means in operative relationship with said payload for imparting desired velocity thereto and, means spaced from said track member presenting a solid impact surface for said payload; said second mass comprising a substantially hollow container adapted to contain a dense flowable material and, means for adjusting the weight of said second mass by programmed discharge of said flowable material.

15. Apparatus for simulating and testing on the earth the dynamic responses anticipated for a payload during impact on the surface of a celestial body where the effective gravitational accelerations of the payload relative to said surface is unequal to that on earth, comprising: a pair of horizontally disposed pulleys, a cable passed over said pulleys, a first and a second mass secured to and suspended from opposite ends of said cable; said first mass including a housing for impact apparatus, said impact apparatus including an adjustable track member, means supported by said track for releasably securing said payload thereto, means in operative relationship with said track for imparting velocity to said payload, and means spaced from said track member presenting an angularly adjustable impact surface for said payload; said second mass comprising a substantially hollow container, a dense flowable material disposed within said container, and exit means provided on said container for adjusting the weight of said second mass by programmed discharge of said flowable material.

16. Apparatus for simulating and testing on the earth impact forces anticipated for a payload during impact on the surface of a celestial body, comprising: a pair of horizontally disposed pulleys, a cable passed over said pulleys, a first and a second mass secured to and suspended from opposite ends of said cable; said first mass including housing for impact apparatus, support means provided in said housing for releasably secured said payload therein, means in operative relationship with said payload for imparting velocity thereto, means spaced from said support means presenting a solid impact surface for said payload; said second mass including a container of flowable material, and means for adjusting the weight of said second mass by programmed discharge of said flowable material from said container.

17. Apparatus for simulating on earth the responses of a payload during impact on the surface of a celestial body where the effective gravitational accelerations of said payload relative to said surface is unequal to that found upon impact with the earth's surface, comprising: a pair of horizontally disposed pulleys, a cable passed over said puleys secured to and effecting suspension of a first and a second mass at opposite ends thereof; said first mass including a housing for impact apparatus, said impact apparatus including a vertically adjustable track member, means supported by said track for releasably securing said payload thereto, means in operative relationship with said track and said payload for imparting velocity to said payload, angularly adjustable means spaced from said track member presenting a solid impact surface for said payload; said second mass comprising a substantially hollow container having a flowable material therein, means on said container for adjusting the weight of said second mass; and counterpoise weight means operatively connected to said container.

18. Apparatus for simulating and testing on the earth the dynamic responses anticipated for a payload during impact on the surface of a celestial body having a gravitational field unequal to that on earth, comprising: a pair of horizontally disposed pulleys, a cable passed over said pulleys, a first and a second mass secured to and suspended from opposite ends of said cable; said first mass including a housing for impact apparatus, said impact apparatus including a laterally and vertically adjustable horizontal track member, means supported by said track for releasably securing said payload thereto, means in operative relationship with said track and said payload for imparting velocity to said payload, means to release said payload for free fall when a predetermined velocity is attained, means spaced from said track member presenting an impact surface for said payload; said second mass comprising a substantially hollow container having a quantity of flowable material therein, and means for adjusting the weight of said second mass by programmed discharge of said flowable material.

19. Apparatus according to claim 18 including a surface coating of a predetermined thickness of dust on said means presenting an impact surface for said payload to simulate a known surface area of the moon.

20. Apparatus according to claim 18 including means normally securing said second mass fixed relative to the earth and adapted to release said second mass in response to a signal, said first mass being precalibrated to exceed the weight of said second mass by a predetermined amount whereby, said second mass may be released after release of said payload for free fall and, said first mass will be accelerated toward the earth causing said second mass to be accelerated away from the earth and said housing for said impact surface to be accelerated in the direction of payload fall prior to impact of said payload with said impact surface.

21. Apparatus according to claim 20 including a counterpoise fixedly secured to said second mass to limit movement thereof.

22. A method of simulating the gravitational field of the moon, in a test device on earth, comprising the steps of: releasing a test object for free fall toward an impact surface and, immediately prior to impact of said object with said surface, accelerating said impact surface in a direction substantially the same as that of the movement of said free falling object at a rate equal to ⅚ of earth gravity.

23. A method of simulating, in a test device on earth, the gravitational field and surface condition of the moon, comprising the steps of: providing a movable impact surface in said test device with a surface coating to simulate a predetermined surface area of the moon, angularly positioning said impact surface to correspond to a predetermined angle of attack for a test object, releasing a test object for free fall in a direction toward said movable surface, and accelerating said impact surface in substantially the same direction of movement as the free falling object and at an acceleration rate equal to ⅚ of earth gravity.

24. Apparatus for simulating and testing on the earth impact forces anticipated for a payload during impact on the surface of a celestial body, comprising: a pair of pulleys, a cable passed over said pulleys; a first and a second mass secured to opposite ends of said cable, said first mass housing support means for releasably securing a payload, means to release said payload for free fall; an impact surface for said payload spaced from said support means and also carried by said first mass, and means to vertically accelerate said impact surface prior to impact of said payload with said impact surface.

25. Apparatus according to claim 24 wherein said second mass has programmed means for adjusting the weight thereof.

References Cited by the Examiner

UNITED STATES PATENTS 2,696,104 12/54 Markey et al _____ 73—11
3,073,550 1/63 Young _____ 73—517 X RICHARD C. QUEISSER, *Primary Examiner.*

DAVID SCHONBERG, *Examiner.*